United States Patent [19]

Hashimoto et al.

[11] Patent Number: 4,495,085
[45] Date of Patent: Jan. 22, 1985

[54] PHOSPHOR

[75] Inventors: Shunichi Hashimoto, Yokohama; Katsutoshi Ohno, Tokyo, both of Japan

[73] Assignee: Sony Corporation, Tokyo, Japan

[21] Appl. No.: 582,782

[22] Filed: Feb. 23, 1984

[30] Foreign Application Priority Data

Feb. 28, 1983 [JP] Japan .................................. 58-31963

[51] Int. Cl.³ .............................................. C09K 11/46
[52] U.S. Cl. ................................ 252/301.4 F; 313/468
[58] Field of Search .................. 252/301.4 F; 313/468

[56] References Cited

U.S. PATENT DOCUMENTS 3,063,946 11/1962 Mooney .................... 252/301.4 F X
3,157,602 11/1964 Ropp ......................... 252/301.4 F X
3,373,302 3/1968 Barber ....................... 252/301.4 F X
3,459,673 8/1969 Best et al. ..................... 252/301.4 F
4,215,289 7/1980 De Hair et al. ........... 252/301.4 F X

OTHER PUBLICATIONS

Karapetyan, "Izv Akad. Nauk SSSR Ser. Fiz." 26 (6), 1963, 799–802.

*Primary Examiner*—Jack Cooper
*Attorney, Agent, or Firm*—Hill, Van Santen, Steadman & Simpson

[57] ABSTRACT

A phosphor which emits white light upon excitation and is characterized by a long decay time, the phosphor consisting of a host material of calcium silicate having the formula:

$$CaO \cdot xSiO_2$$

where x is in the range from 0.5 to 1, and an activator consisting of dysprosium (Dy) in the ratio of 0.05 to 10 mol % of each 1 mol of the host material.

9 Claims, 8 Drawing Figures

F I G. 3D
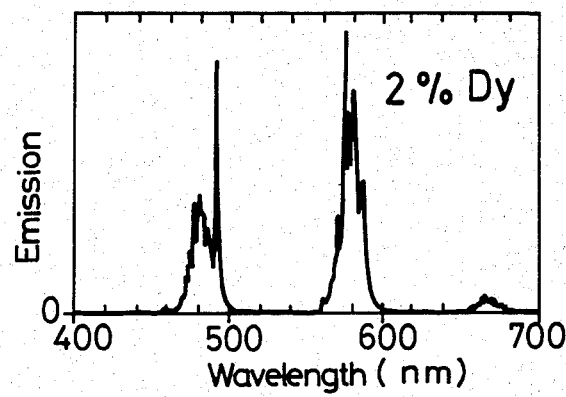
F I G. 3E
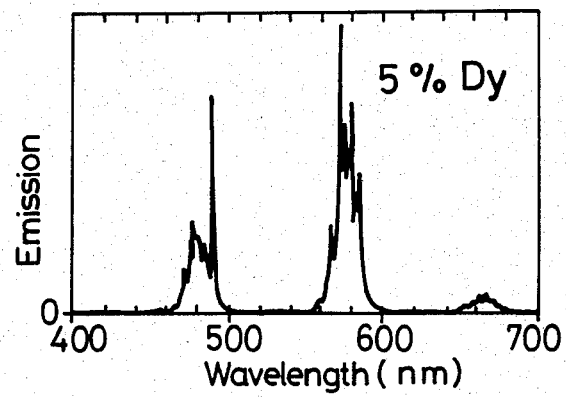
F I G. 4
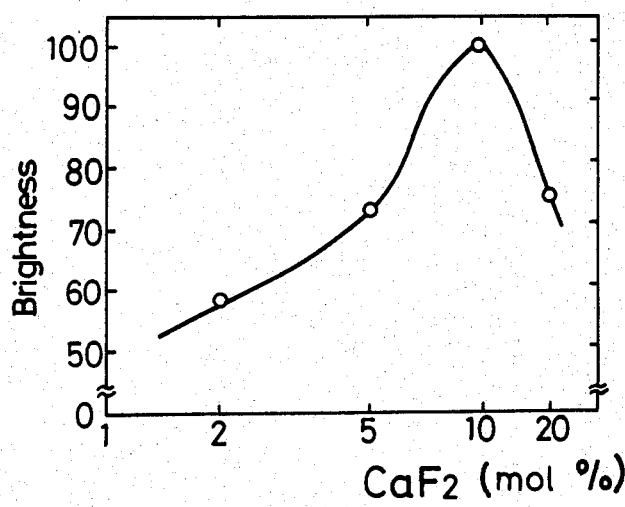

PHOSPHOR

BACKGROUND OF THE INVENTION

1. Field of the Invention

This invention is in the field of phosphors for cathode ray tubes and deals with improved material consisting of dysprosium activated calcium silicate. The phosphor is particularly useful in a cathode ray tube of high definition which is used as a terminal display apparatus for a computer, for example.

2. Description of the Prior Art

As computer technology has advanced, a picture tube of high definition which is capable of graphic display and display of Chinese characters of fine resolution has been developed for the terminal display apparatus of a computer. In such picture tubes, in order to increase the resolution, it is necessary that the horizontal scanning speed be very high, with the number of scanning lines being increased to a range from 1,000 to 2,000. At the same time, the frame repetition frequency is lowered. For this reason, when a phosphor used in an ordinary picture tube is employed, its decay time is too short and causes flickering. It is therefore necessary to use a phosphor in this type of picture tube which has a long decay time.

Some long decay phosphors have been previously suggested in the prior art. There is the green color emission phosphor, P39 ($Zn_2SiO_4$:Mn, As) and the red color emission phosphors, P27 ($Zn_3(PO_4)_2$:Mn), and P13 ($MgSiO_3$:Mn) and these have been put into practical use. However, there is no long decay phosphor which emits a white light under excitation presently known to the art.

To provide a long decay phosphor material capable of white color emission in, for example, a black and white picture tube of high definition, the phosphor P40 has been used which is produced by mixing ZnS:Ag having a blue color emission characteristic with (Zn, Cd)S:Cu having a yellowish green color emission. The P40 phosphor has the property that the (Zn, Cd)S:Cu having the yellow green color emission is excited by the blue light emitted from the ZnS:Ag having the blue color emission properties to provide a long decay emission. Since the ZnS:Ag of the blue color phosphor does not have a long decay property, a white color emission of long decay time cannot be obtained by the use of P40. Moreover, under the excitation by an electron beam, the (Zn, Cd)S:Cu having yellowish green color emission does not provide a decay time which is as long as that presented by the light excitation. Therefore, in order that the long decay property be present in the picture tube it becomes necessary to provide a phosphor screen of a particular construction which can be excited effectively by the blue color emission of ZnS:Ag, for example, a double layer coating treatment and the like. This treatment creates problems because the manufacturing process of the phosphor screen of the picture tube becomes complicated. Furthermore, even if a white color transmission phosphor is formed by mixing phosphors of long decay properties such as the above-noted P39, P27, or the like, the decay times of the respective phosphors are different so that the decay light is not a white color. At present, it has not been possible to provide phosphors which have color components whose decay characteristics are identical or substantially so. Thus, the prior art still lacks phosphors having white color emission and long decay characteristic properties.

SUMMARY OF THE INVENTION

The present invention seeks to provide a phosphor having a long decay time and which will continue to emit white color even during decay or afterglow. The invention also seeks to provide a phosphor which provides white color emission upon electron beam excitation without mixing phosphors of various color components but using a single material under the excitation of the electron beam.

The phosphor of the present invention carries out white color emission of long decay time even after the excitation therefor is removed. The invention therefore provides a phosphor of long decay time which is suitable to be applied to a picture tube of high definition.

In accordance with the present invention, there is provided a phosphor comprising:

a host material of calcium silicate expressed by the formula $CaO.xSiO_2$ where x is in the range of 0.5 to 1, and dysprosium (Dy) added to the host material as an activator in a mol ratio of 0.5 to 10 mol % relative to 1 mol of the host material.

BRIEF DESCRIPTION OF THE DRAWINGS

FIGS. 2 and 3A to 3E are graphs showing the emission characteristics of some of the phosphors of the present invention in relation to the wavelength emitted; and FIG. 4 is a graph showing the relationship between brightness and the amount of calcium fluoride added as a flux.

DESCRIPTION OF THE PREFERRED EMBODIMENTS

The present invention will be described more completely with reference to specific examples.

In the present invention, powders of $CaCO_3$, $SiO_2$ and $Dy_2O_3$ were used as the starting materials. They were weighed at predetermined ratios and then mixed together in a glass bottle for several hours. Afterwards, the mixed powders were filtered and dried. The mixture thus made was put into an alumina crucible and burned or baked from 2 to 3 hours at a temperature ranging from 1,000° to 1,300° C. in air. At that time, a flux consisting of calcium fluoride ($CaF_2$) or barium chloride ($BaCl_2$) was added. From 1 to 20 mol % of calcium fluoride or barium chloride powder was added to the mixtures. The light emission characteristic of a dysprosium-activated calcium silicate phosphor was produced and was measured with the excitation of an electron beam and the long decay characteristic was measured by a demountable apparatus. A picture tube was constructed in such a manner that the above phosphor was coated on the inner surface of a front panel of the tube envelope.

EXAMPLE 1

A mixture was prepared containing 100 g of $CaCO_3$ powder having a purity of 99.99%, 42 g of $SiO_2$ powder having a purity of 99.99%, $Dy_2O_3$ powders having a purity of 99.99% were included as an activator, and 3.9 g of calcium fluoride was used as a flux. The mixture was dried and then baked for 3 hours at 1,100° C. in air. In this Example 1, the phosphor samples were obtained by changing the amount of the activator, $Dy_2O_3$, in the range from 0.047 g to 9.32 g.

According to the X-ray microanalysis, the host material of each sample was $Ca_2SiO_4$, namely, $2CaO.SiO_2$ which corresponds to the formula $CaO.xSiO_2$ where $x=0.5$.

Figure 1:
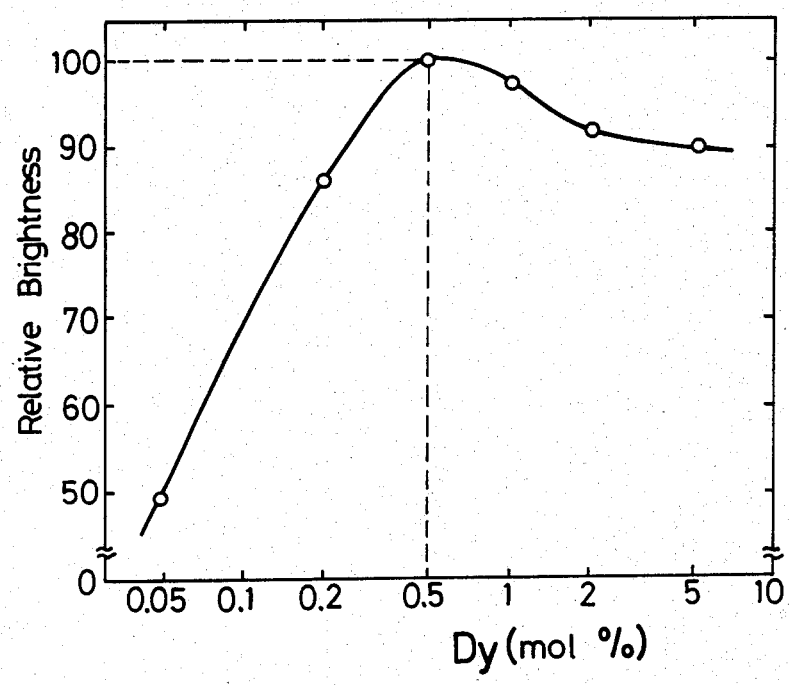
FIG. 1 is a graph plotting relative brightness of the phosphor as a function of the concentration of dysprosium.

The dysprosium concentration of each sample was varied within the range of 0.05 to 10 mol % for each mol of host material. The relationship between the dysprosium concentration and the brightness of the samples within these ranges of activator were measured and their results are indicated on the graph of FIG. 1. According to FIG. 1, the sample whose dysprosium concentration is 0.5 mol % represents the highest brightness.

Figure 2:
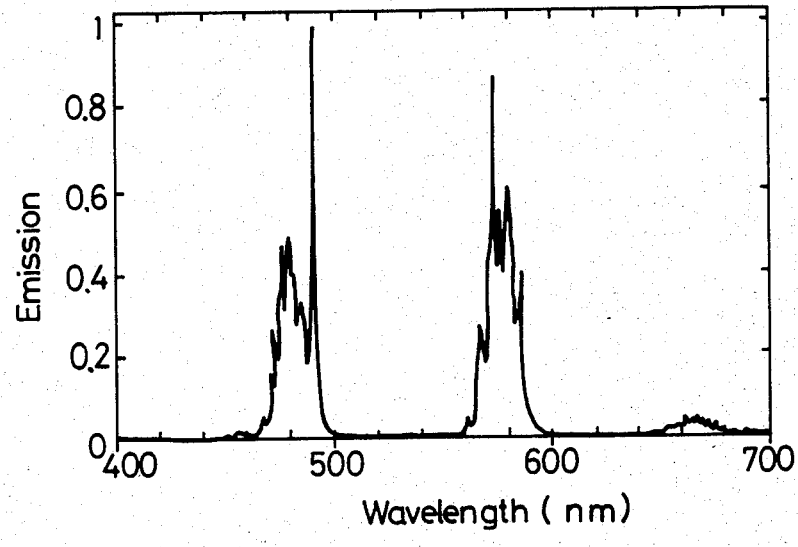
Figure 3A:
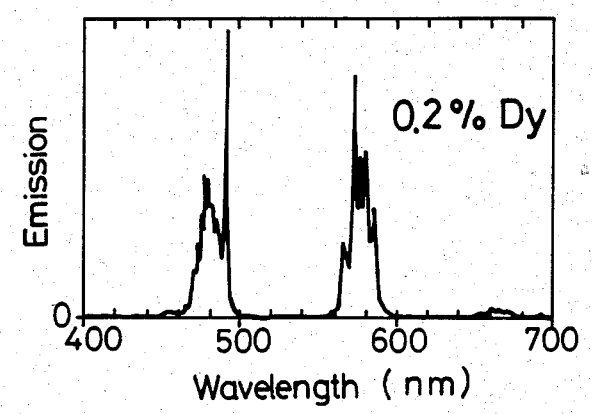
Figure 3B:
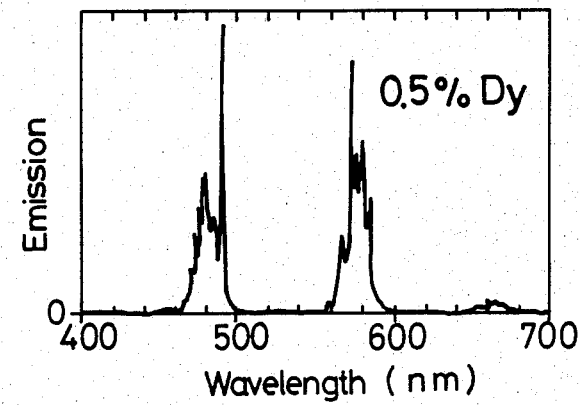
Figure 3C:
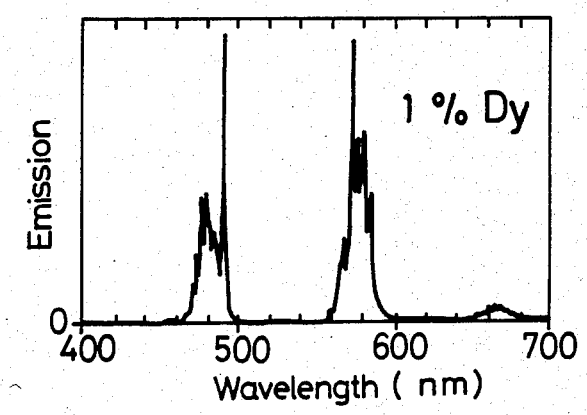

FIG. 2 is a graph showing the light emission spectrum of the sample used according to Example 1 in which the concentration of dysprosium activator is 0.5 mol %. This light emission spectrum presents peak values at the wavelengths of 490 nm, 570 nm and 670 nm, respectively. As a result, the light emission was observed as a white color emission on the whole.

FIGS. 3A, 3B, 3C, 3D and 3E are graphs showing emission spectra of samples in which the Dy concentration was 0.2 mol %; 0.5 mol %; 1 mol %, 2 mol %, and 5 mol %, respectively. As will be seen from these graphs, as the dysprosium concentration is increased, the light emission intensity having a peak value on the high energy side, namely, the low wavelength side, was decreased and thus the light emission became yellowish on the whole. When the dysprosium concentration is less than 10 mol %, the emission of the phosphor sample thus obtained lies within a range of white on a CIE (International Commission on Illumination) chromaticity diagram.

EXAMPLE 2

Phosphor samples were obtained by the same manner as in Example 1. In this case, the amount of $Dy_2O_3$ powder was 0.47 g, so that the Dy concentration was 0.5 mol %. The amount of calcium fluoride powder added as flux was changed in the range from 0.39 to 7.8 g and phosphor samples were obtained.

The measured results of the relationship between the concentration of $CaF_2$ and the brightness of the respective phosphor samples is shown in the graph of FIG. 4. From this Figure, it will be seen that when the amount of $CaF_2$ was 3.9 g, namely, at a concentration of 10 mol %, the brightness of the phosphor sample became maximum. It was found appropriate to add $CaF_2$ powder as a flux within a concentration range of 1 to 20 mol %.

EXAMPLE 3

Phosphor samples were formed by the same manner as in Example 2 but instead of calcium fluoride powder being used as a flux, barium chloride powder was added. In this case, the same results are obtained as in Example 2 so that when the concentration of barium chloride was 10 mol %, the brightness of the phosphor sample became maximum. The appropriate concentration of barium chloride lies in the range from 1 to 20 mol %.

EXAMPLE 4

Phosphor samples were formed in the same manner as in Example 1. In this case, however, the amount of $SiO_2$ was 84 g and the amount of $Dy_2O_3$ was 3.73 g (1 mol %). The host material was $CaSiO_3$ according to X-ray microanalysis. In the previous formula, this represented the condition where $x=1$. A white color emission, long decay phosphor was obtained.

As will be clear from the above examples, any of the phosphors having a host material of calcium silicate activated by dysprosium can present a white color emission of long decay time.

Since the phosphor of the present invention has a decay time of several tens of m sec before the emission is decayed to 1/10 (the time required to achieve 1/10 brightness after termination of excitation) and the emission is white, the phosphor of the present invention when applied to a picture tube of high definition can provide a picture of high grade and excellent quality.

The phosphor of the present invention is not formed by a plurality of phosphors of color components as in the prior art example but by a single component. Thus, the phosphor according to the present invention does not provide problems concerning dispersing properties, coating, and optical characteristics caused by a difference of physical and chemical properties between the phosphors as is the case when phosphors of two kinds or more are used. More particularly, in a picture tube employed as the terminal display apparatus of a computer, the picture screen is viewed at shorter range than with an ordinary television picture tube. Therefore, when a phosphor is used composed of phosphors of two colors, the respective colors are separated to cause a flicker easily. This flicker causes significant fatigue of the eyes. To avoid this defect, the greatest care must be paid to the coating of the phosphors, considering the dispersed state of each phosphor. Moreover, a problem of difference between the color emission under the excitation conditions and the color in the decay thereof caused by the difference between the decay characteristics of the respective colors is inevitable. However, according to the present invention, such defects can all be removed, the handling of the phosphor simplified, and the coating requirements can be lightened, resulting in a considerable industrial advantage.

The above description deals with preferred embodiments of the invention, but it will be apparent that many modifications and variations can be effected by one skilled in the art without departing from the spirit or scope of the novel concepts of the invention so that the scope of the invention should be determined by the appended claims only.

We claim as our invention:

1. A phosphor comprising:
a host material of calcium silicate having the formula:

$CaO.xSiO_2$ where x is in the range of 0.5 to 1, and
an activator of dysprosium in an amount of 0.05 to 10 mol % relative to one mol of said host material, said phosphor emitting essentially white light under excitation by an electron beam source and having a long decay time during which it emits essentially white light after the excitation source is removed.

2. A phosphor according to claim 1 wherein:
said dysprosium is present in an amount of about 0.2 mol %.

3. A phosphor according to claim 1 wherein:

said dysprosium is present in an amount of about 0.5 mol %.

4. A phosphor according to claim 1 wherein:
said dysprosium is present in an amount of about one mol %.

5. A phosphor according to claim 1 wherein:
said dysprosium is present in an amount of about 2 mol %.

6. A phosphor according to claim 1 wherein:
said dysprosium is present in an amount of about 5 mol %.

7. A phosphor according to claim 1 having light emission peaks at about 490 nm, 570 nm and 670 nm.

8. A phosphor according to claim 1 which is prepared by forming a powdery mixture of $CaCO_3$, $SiO_2$, $Dy_2O_3$ and from 1–20 mol % of $CaF_2$ flux and baking the mixture for 2–3 hours at a temperature of from 1000° to 1300° C. in air.

9. A phosphor according to claim 1 which is prepared by forming a powdery mixture of $CaCO_3$, $SiO_2$, $Dy_2O_3$ and from 1–20 mol % of $BaCl_2$ flux and baking the mixture for 2–3 hours at a temperature of from 1000° to 1300° C. in air.

* * * * *